(12) United States Patent
Dettinger et al.

(10) Patent No.: US 6,938,036 B2
(45) Date of Patent: Aug. 30, 2005

(54) QUERY MODIFICATION ANALYSIS (75) Inventors: Richard D. Dettinger, Rochester, MN (US); Richard J. Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 10/279,157

(22) Filed: Oct. 24, 2002

(65) Prior Publication Data
US 2004/0083204 A1 Apr. 29, 2004

(51) Int. Cl.⁷ .............................................. G06F 17/30
(52) U.S. Cl. .............................. 707/3; 707/4; 707/100; 707/2
(58) Field of Search ............................ 707/1, 3, 4, 100, 707/102, 104.1

(56) References Cited

U.S. PATENT DOCUMENTS

| | | | | |
|---|---|---|---|---|
| 5,442,781 A | * | 8/1995 | Yamagata ....................... | 707/3 |
| 5,696,962 A | * | 12/1997 | Kupiec ........................... | 707/4 |
| 5,826,260 A | * | 10/1998 | Byrd et al. ..................... | 707/5 |
| 5,983,237 A | * | 11/1999 | Jain et al. ................. | 707/104.1 |
| 6,169,986 B1 | * | 1/2001 | Bowman et al. ............... | 707/5 |
| 6,226,635 B1 | * | 5/2001 | Katariya ......................... | 707/4 |
| 6,272,488 B1 | | 8/2001 | Chang et al. | |
| 6,430,552 B1 | * | 8/2002 | Corston-Oliver ............... | 707/3 |
| 6,691,103 B1 | * | 2/2004 | Wozny .......................... | 707/2 |
| 6,725,227 B1 | | 4/2004 | Li ............................... | 707/100 |
| 6,751,606 B1 | * | 6/2004 | Fries et al. .................... | 707/3 |
| 2002/0059199 A1 | * | 5/2002 | Harvey .......................... | 707/3 |
| 2002/0065815 A1 | * | 5/2002 | Layden .......................... | 707/3 |
| 2002/0194166 A1 | * | 12/2002 | Fowler .......................... | 707/3 |
| 2003/0088545 A1 | * | 5/2003 | Subramaniam et al. ........ | 707/3 |
| 2004/0068486 A1 | * | 4/2004 | Chidlovskii .................... | 707/3 |

* cited by examiner

*Primary Examiner*—Luke S Wassum
*Assistant Examiner*—Susan F. Rayyan
(74) *Attorney, Agent, or Firm*—Moser, Patterson & Sheridan, LLP (57) ABSTRACT

Methods, systems and articles of manufacture are provided for a query analysis approach used to identify "nondestructive" and "destructive" queries. In one aspect, a "nondestructive" query is one which does not return any additional results relative to results returned by a previously executed query or queries. Conversely, a "destructive" query is one which does return additional results relative to results returned by a previously executed query. If the query is determined to be destructive, the query is executed against the complete data repository (e.g., database or data warehouse). If the query is nondestructive, the query (or some restructured form thereof) is executed against a data subset of the complete data repository.

31 Claims, 4 Drawing Sheets

QUERY MODIFICATION ANALYSIS

CROSS-REFERENCE TO RELATED APPLICATIONS

This application is related to U.S. patent application Ser. No. 10/083,075, filed Feb. 22, 2002 entitled "Improved Application Flexibility Through Database Schema and Query Abstraction", U.S. patent application Ser. No. 10/131,984, filed Apr. 25, 2002 entitled "Remote Data Access and Integration of Distributed Data Sources Through Data Schema and Query Abstraction" and U.S. patent application entitled "Data Query Differential Analysis" which are hereby incorporated herein in their entirety.

This application is a continuation-in-part of, and claims priority to, Ser. No. 10/264,124, filed on Oct. 3, 2002 by Dettinger et al., entitled "DATA QUERY DIFFERENTIAL ANALYSIS".

BACKGROUND OF THE INVENTION

1. Field of the Invention

The present invention generally relates to data processing and more particularly to processing queries configured to access data in a data repository.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

A DBMS is structured to accept commands to store, retrieve and delete data using, for example, high-level query languages such as the Structured Query Language (SQL). The term "query" denominates a set of commands for retrieving data from a stored database. These queries may come from users, application programs, or remote systems (clients or peers). The query language requires the return of a particular data set in response to a particular query but the method of query execution ("Query Execution Plan") employed by the DBMS is not specified by the query. The method of query execution is typically called an execution plan, an access plan, or just "plan". There are typically many different useful execution plans for any particular query, each of which returns the required data set. For large databases, the execution plan selected by the RDBMS to execute a query must provide the required data return at a reasonable cost in time and hardware resources. In general, the overall optimization process includes four broad stages. These are (1) casting the user query into some internal representation, (2) converting to canonical form, (3) choosing prospective implementation procedures, and (4) generating executable plans and choosing the cheapest of the plans.

Optimization, and execution generally, can be a resource intensive and time-consuming process. Further, the larger the database, the longer the time needed to execute the query. From the end user's standpoint, the undesirable impact of query execution overhead is increased when a plurality of queries is executed. In many data mining and data query scenarios, it is often the case that the end user does not know, at the outset, the precise data they are after. In this scenario, the user typically issues a query, examines the results, modifies the query based on analysis of the results and then runs the modified query. In cases where the data being query is very extensive and complex, this can be a very time and resource intensive process, given the duplicative processing that takes place each time the user submits a new query.

Therefore, there is a need for a more efficient query execution method.

SUMMARY OF THE INVENTION

The present invention generally provides methods, systems and articles of manufacture for a query analysis used to identify "nondestructive" and "destructive" query modifications.

One embodiment provides a method of processing queries, comprising receiving a query; performing a comparative analysis between the query and one or more previously executed queries to determine a difference in scope with respect to results; and executing the query against one of a first data source and a second data source depending upon the difference in scope determined by the comparative analysis, where the second data source is a subset of the first data source.

Another embodiment provides a method of processing queries, comprising receiving a query; performing a comparative analysis between the query and one or more previously executed queries to determine a difference in scope with respect to results; and depending upon the difference in scope determined by the comparative analysis, performing one of: (i) executing the query against a first data source; and (ii) restructuring the query and executing the restructured query against a second data source, where the second data source is a subset of the first data source.

Yet another embodiment of a method of processing queries, comprises receiving a query; performing comparative analysis between a structure of the query and a structure of a plurality of previously executed queries to determine a difference in scope with respect to results; and upon determining that a results scope of the query is less than at least one of the plurality of previously executed queries: (i) restructuring the query; and (ii) executing the restructured query against a first data source, where the first data source contains results returned from execution of the at least one of the plurality of previously executed queries.

Yet another embodiment provides a computer readable medium containing a program which, when executed, performs an operation, comprising: performing a comparative analysis between a query received for execution and one or more previously executed queries to determine a difference in scope with respect to results; and submitting the query for execution against one of a first data source and a second data source depending upon the difference in scope determined by the comparative analysis, where the second data source is a subset of the first data source.

Still another embodiment provides a computer readable medium containing a program which, when executed, performs an operation, comprising performing a comparative analysis between a query received for execution and one or more previously executed queries to determine a difference in scope with respect to results; and depending upon the difference in scope determined by the comparative analysis, performing one of: (i) submitting the query for execution against a first data source; and (ii) restructuring the query and submitting the restructured query for execution against a second data source, where the second data source is a subset of the first data source.

Still another embodiment provides a computer readable medium containing a program which, when executed, performs an operation, comprising performing a comparative analysis between a structure of a query received for execution and a structure of a plurality of previously executed queries to determine a difference in scope with respect to results; and upon determining that a results scope of the query is less than at least one of the plurality of previously executed queries: (i) restructuring the query; and (ii) executing the restructured query against a first data source, where the first data source contains results returned from execution of the at least one of the plurality of previously executed queries.

Still another embodiment provides a computer system, comprising: a data repository, comprising a first data source and a second data source, wherein the second data source is a data subset of the first data source populated with results of previously executing queries; a runtime component; a processor which, when configured with the runtime component, performs an operation. The operation comprises: performing a comparative analysis between a structure of a query received for execution and a structure of a previously executed query to determine a difference in scope with respect to results; upon determining that a results scope of the query is greater than the previously executed query, executing the restructured query against the first data source; and upon determining that the results scope of the query is less than the previously executed query: (i) restructuring the query; and (ii) executing the restructured query against the second data source.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Methods, systems and articles of manufacture are provided for a query analysis approach used to identify "non-destructive" and "destructive" query modifications. In one aspect, a "non-destructive" query is one which does not return any additional results relative to results returned by a previously executed query or queries. Conversely, a "destructive" query is one which does return additional results relative to results returned by a previously executed query. According to one embodiment, the differences between a current query and one or more previous queries are analyzed to determine whether the current query is destructive or nondestructive relative to the one or more previous queries. If the current query is destructive relative to all prior queries, the query is executed against the complete data repository (e.g., database or data warehouse). If the current query is nondestructive with respect to at least one query, the query is executed against a data subset of the complete data repository.

To illustrate aspects of a nondestructive query, consider the following queries:

Initial Query

SELECT gender, name, age FROM demographics WHERE age>50

Subsequent Query

SELECT name, age FROM demographics WHERE age>50 and gender="female"

In this case, the Subsequent Query differs from Initial Query in that (i) the Subsequent Query eliminates a result field (gender) and (ii) the Subsequent Query includes an ANDed condition involving a field generated by the Initial Query. Both modifications are non-destructive in that neither returns a result not returned by the Initial Query. As such, the Subsequent Query is considered to be non-destructive with respect to the Initial Query. Steps may then be taken to restructure the Subsequent Query so that the restructured Subsequent Query is executed against a results subset of total results of the database.

Although reference is made to SQL in some embodiments, non-SQL query languages are within the scope of the present invention.

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
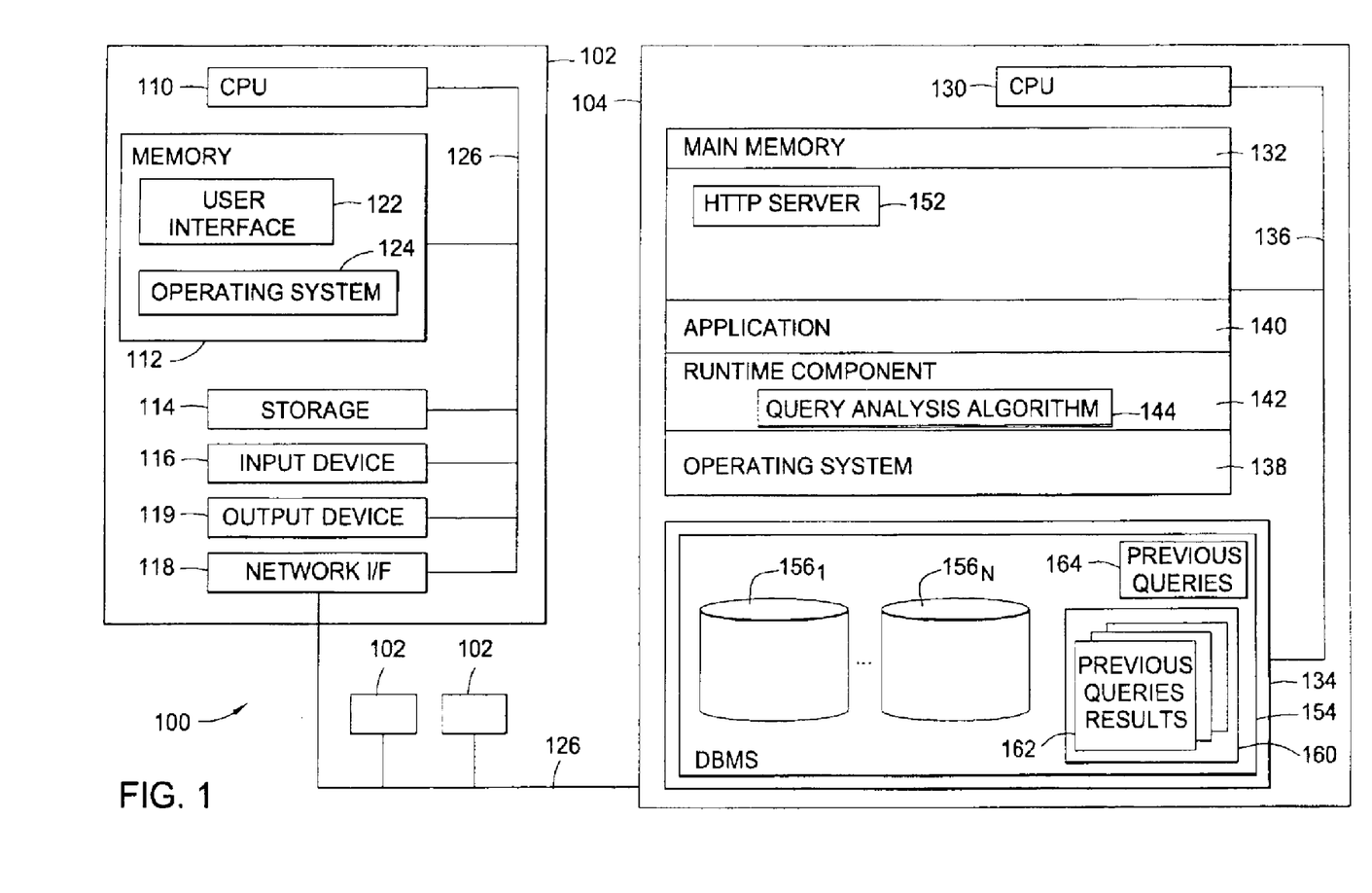
FIG. 1 illustrates one embodiment of the invention implemented in a networked environment.

FIG. 1 depicts a block diagram of a networked system 100 in which embodiments of the present invention may be implemented. In general, the networked system 100 includes a client (e.g., user's) computer 102 (three such client computers 102 are shown) and at least one server 104 (one such server 104). The client computer 102 and the server computer 104 are connected via a network 126. In general, the network 126 may be a local area network (LAN) and/or a wide area network (WAN). In a particular embodiment, the network 126 is the Internet.

The client computer 102 includes a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, trackball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any entry/exit device configured to allow network communications between the client computer 102 and the server computer 104 via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux and Microsoft's Windows®. More generally, any operating system supporting the functions disclosed herein may be used.

The memory 112 is also shown containing a UI program 122 that, when executed on CPU 110, provides support for navigating between the various servers 104 and locating network addresses at one or more of the servers 104. In one embodiment, the UI program 122 includes a web-based Graphical User Interface (GUI), i.e., a browser, which allows the user to display Hyper Text Markup Language (HTML) information. More generally, however, the UI program 122 is representative of any user interface (whether or not GUI-based) capable of rendering the information transmitted from the server computer 104.

The server computer 104 may be physically arranged in a manner similar to the client computer 102. Accordingly, the server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

The server computer 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used. The server computer 104 includes databases $156_1 \ldots 156_N$, collectively referred to as database(s) 156. The databases 156 are representative of any collection of data regardless of the particular physical representation/arrangement or schema. By way of illustration, the databases 156 may be organized according to a relational schema (accessible by SQL queries) or according to an XML schema (accessible by XML queries). However, again, the invention is not limited to a particular schema and contemplates extension to schemas presently unknown.

The server computer 104 further includes a secondary data source 160 (where the databases 156 may be considered a primary data source). Generally, the secondary data source 160 comprises one or more data structures containing results from a previously executed query or queries. For convenience, these data structures will be referred to herein as temporary tables 162 but more generally may be any data structure containing previous results and may be relational or non-relational. In one embodiment, the temporary tables 162 represent cached results from previous queries executed against the databases 156, and which may be deleted after a period of time. As such, the temporary tables 162 are results subsets of the databases 156.

The server computer 104 further includes a cache 164 of previously executed queries. Generally, the cache 164 is representative of any temporary or persistent data structure(s) containing one or more queries previously executed against the databases 156 and, in one embodiment, one or more queries previously executed against the secondary data source 160.

Although shown separately, the cached previous queries may be included with the results contained in the temporary tables 162. Specifically, each temporary table 162 may contain a previously executed query and its respective results. Where the previously executed queries and their respective results are stored separately (as shown), each previously executed query may be associated with its respective results by pointers, where the pointers cross-reference the respective queries and temporary tables 162).

Illustratively, the databases 156, the secondary data sources 160 and the cached queries 164 are shown as part of a database management system (DBMS) 154 in storage 134. Illustratively, the DBMS 154 comprises the "DB2" product offered by the IBM Corporation for the "MVS", "AIX", or "OS/2" operating systems. Generally, those skilled in the art will recognize that the present invention has application to any DBMS software that uses SQL, and may similarly be applied to non-SQL queries. More generally, however, it should be understood that the data to be accessed (i.e., the databases 156, the temporary tables 162, and the cached queries 164) need not be part of a DBMS at all; there need only be a means to associate a prior query with the results generated by that query. Further, some or all of the data may reside locally on the client computer 102. However, a networked environment such as the one shown in FIG. 1, may be preferred for its capability of supporting a multi-user, multi-transaction environment.

The memory 132 further includes an application 140 and a runtime component 142, which includes a query analysis algorithm 144. The application 140 and runtime component 142 are software products comprising a plurality of instructions that are resident at various times in various memory and storage devices in the computer system 100. When read and executed by one or more processors 130 in the server 104, the application 140 and/or runtime component 142 cause the computer system 100 to perform the steps necessary to execute steps or elements embodying the various aspects of the invention. Although shown as separate elements, in one embodiment, the runtime component 142 may integral with the DBMS 154. However, by providing the runtime component 142 separately from the DBMS 154, it is contemplated that the runtime component 142 may service a plurality of database management systems capable of executing queries received from the runtime component 142.

In one embodiment, elements of a query are specified by a user through a graphical user interface (GUI) represented by the UI program 122. The content of the GUIs may be generated by the application 140. In a particular embodiment, the GUI content is hypertext markup language (HTML) content which may be rendered on the client computer systems 102 with the UI program 122. Accordingly, the memory 132 includes a Hypertext Transfer Protocol (http) server process 152 (e.g., a web server) adapted to service requests from the client computer 102. For example, the process 138 may respond to requests to access a database(s) 156, which illustratively resides on the server 104. Incoming client requests for data from a database 156 invoke the application 140. When executed by the processor 130, the application 140 causes the server computer 104 to perform the steps or elements embodying the various aspects of the invention, including accessing the database(s) 156. In one embodiment, the application 140 comprises a plurality of servlets configured to build GUI elements, which are then rendered by the UI program 122.

FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable future changes in a particular markup language as well as to other languages presently unknown. Likewise, the http server process 152 shown in FIG. 1 is merely illustrative and other embodiments adapted to support any known and unknown protocols are contemplated.

Figure 2:
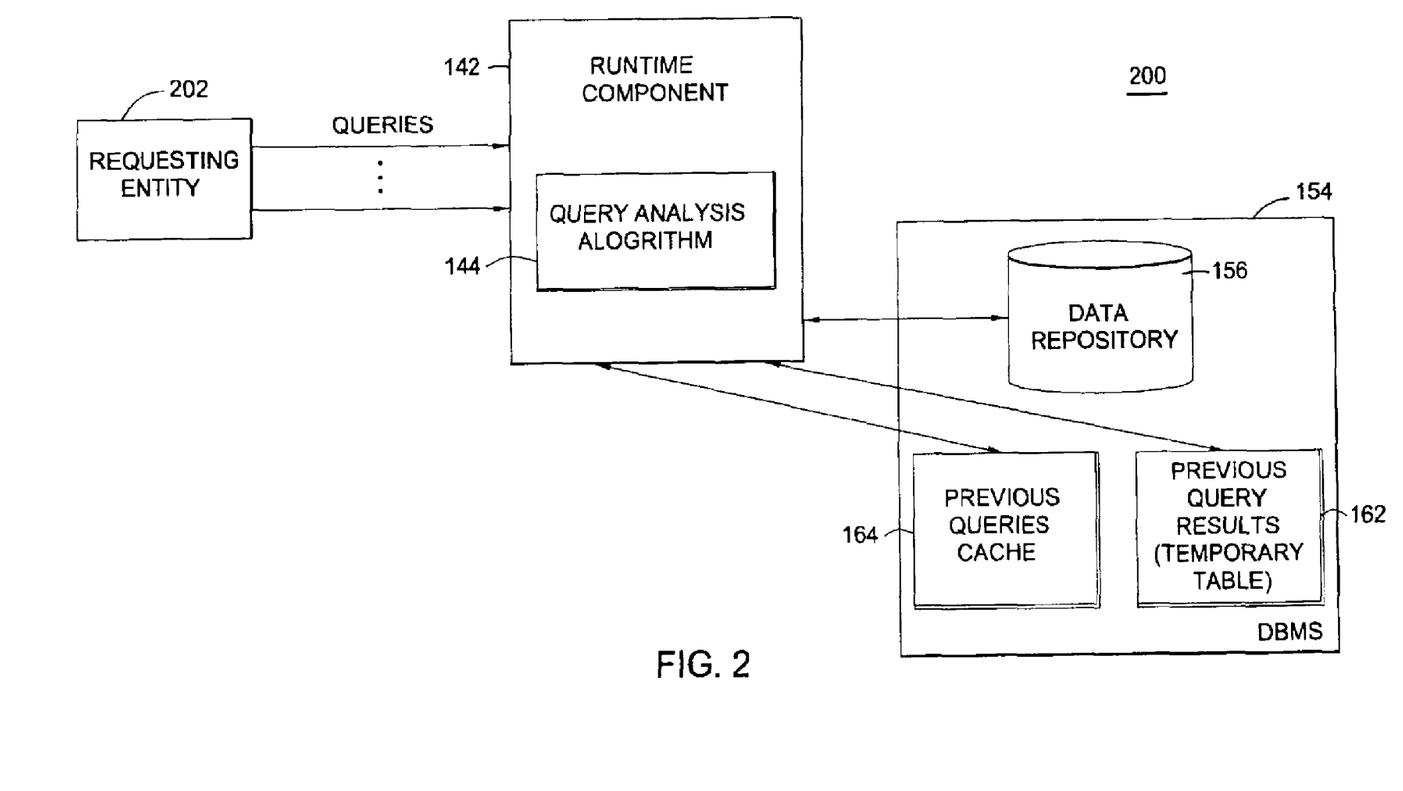
FIG. 2 is an exemplary logical view of a requesting entity, a run-time component and data.

Referring now to FIG. 2, the relationship between a requesting entity 202, the runtime component 142 and the databases 156 is shown. In general, the requesting entity 202 may be any entity issuing a request (i.e., query) to access the databases 156, including the application 140, the operating system 138 and, at the highest level, an end user. The run-time component 142 receives the queries from the requesting entity 202 and performs an analysis according to the query analysis algorithm 144. Specifically, the query analysis algorithm 144 performs a comparative analysis between a current query received from the requesting entity 202 and one or more previously executed queries (stored in the previous queries cache 164). The comparative analysis examines the structure of the current query and the one or more previously executed queries to determine a relative scope of the queries with respect to results. Depending upon the outcome of the comparative analysis, the current query is executed either against the complete data repository 156 or against one or more temporary tables 162.

Figure 3:
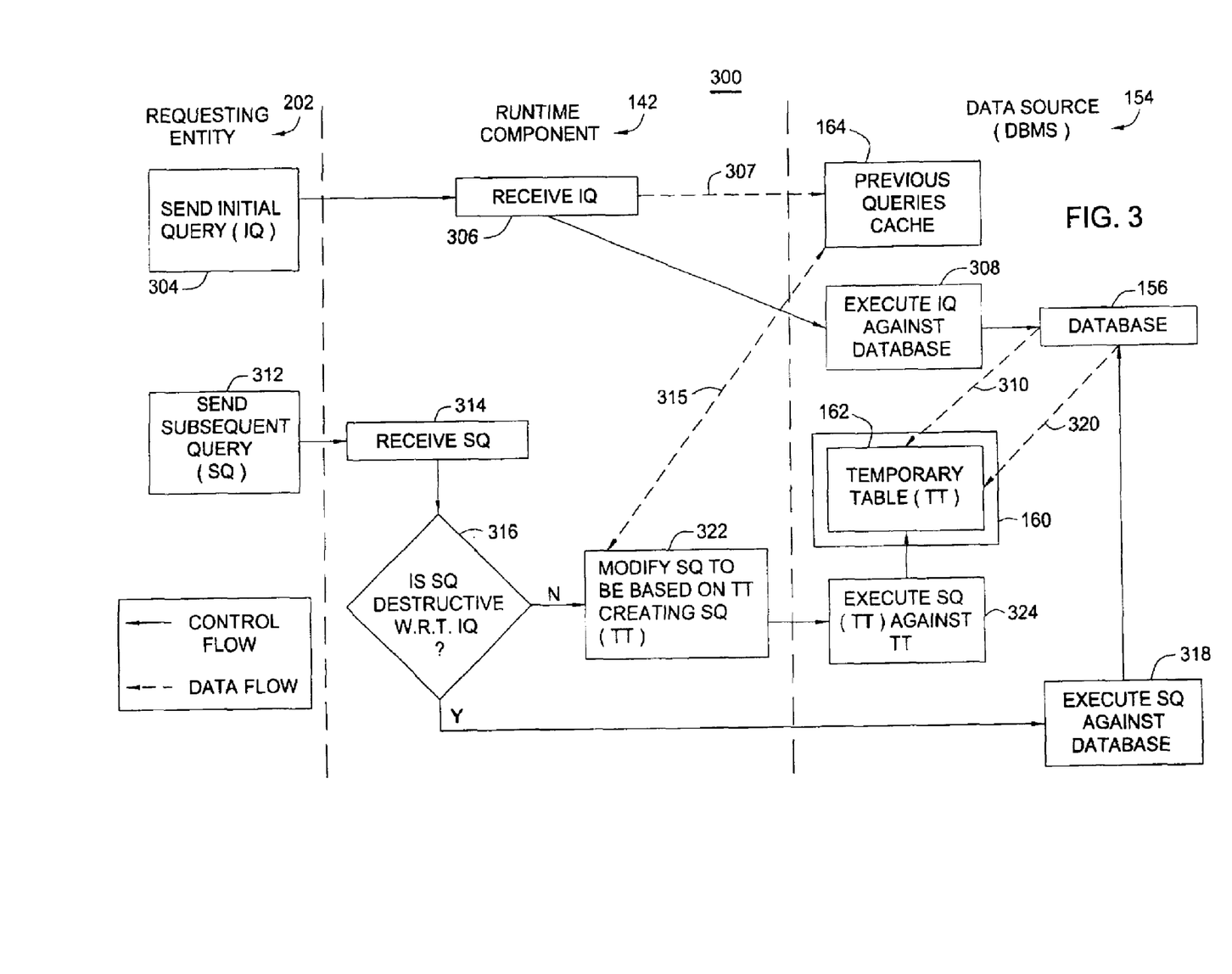
FIG. 3 is an exemplary view of a run-time environment.

Referring now to FIG. 3, an illustrative run-time environment 300 shown. Generally, the run-time environment 300 includes the requesting entity 202, the runtime component 142 and a data source (illustratively the DBMS 154). Initially, the requesting entity issues an initial query (step 304). The term "initial" is used to indicate a query issued by the requesting entity 202 when no temporary table 162 exists. The initial query is received (step 306) by the runtime component 142, cached (data flow arrow 307) and then submitted to the DBMS 154 for execution (step 308). Because no temporary table 162 exists, the initial query is executed against the primary data source, i.e., the database 156. The results of the execution are stored to the secondary data source 160, as indicated by the data flow arrow 310. In particular, the results are stored to a temporary table 162. Although not shown, the results are also returned to the requesting entity 202 via the runtime component 142.

Subsequently, the requesting entity 202 issues another query (step 312). In one embodiment, features may be implemented to explicitly designate the subsequent query as a variation or modification of a previous query (e.g., the initial query). For example, it is a common feature of user interfaces configured for query construction to provide users with a "Modified Query" option, whereby the user is presented with the last executed query. Such a feature allows users to iteratively execute and recraft queries until the desired results are returned without having to re-enter the entire query each time. Accordingly, one embodiment of the present invention uses such a feature to advantage. Specifically, when user input indicates a subsequent query as being a modification or variation of a previously executed query, then the comparative analysis described below is performed; otherwise, the analysis is not performed. Of course, persons skilled in the art will recognize that the analysis may simply be performed for each query, regardless of whether a user has indicated the query as being a modified version of a previous query. In another embodiment, the user interface may be configured with a selectable option allowing only non-destructive changes, ensuring the modified query can be used against results of the initial query. Other user-selectable options available through the user interface are contemplated.

Upon receiving and caching the subsequent query (step 314), the query analysis algorithm 144 is invoked (step 316) to determine whether the subsequent query is destructive or nondestructive with respect to the initial query (which is stored in the cache 164). More generally, the analysis may be performed with respect to any previously executed query or combination of queries. One embodiment of the analysis performed by the query analysis algorithm 144 is described below with respect to FIG. 4. If the subsequent query is determined to be destructive, the query is executed against the entire database 156 (step 318). The results of the query execution are stored to the secondary data source 160 (represented by data flow arrow 320). In one embodiment, the results are stored to the temporary table 162 containing the results of the initial query (and, more generally, the results of all previously executed queries). In another embodiment, the results are stored to a separate temporary table 162, such that each subsequent query executed against the entire database 156 causes population of a separate temporary table 162.

If, however, the subsequent query is determined to be nondestructive, the query is modified according to the schema and data of the temporary table 162 (step 322) and cached (data flow line 315). The restructured query is then executed against the secondary data source 160. In one embodiment, where the subsequent query is determined to be a modification or variation of a previously executed query (e.g., the initial query), the subsequent query is executed against the temporary table 162 containing only the results of the previously executed query. In any case, the results of execution may then be returned to the requesting entity 202.

Figure 4:
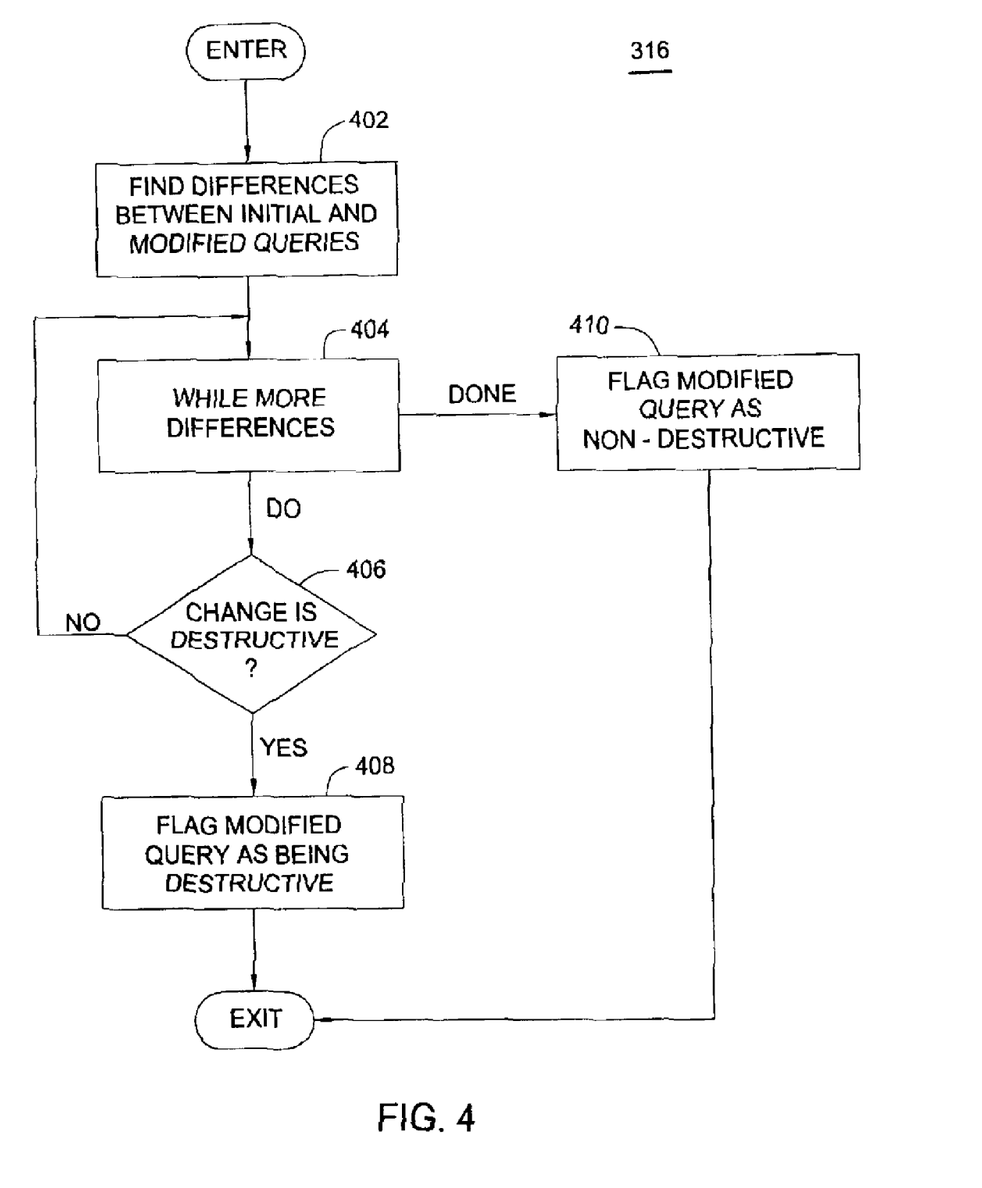
FIG. 4 is a flowchart illustrating the determination of whether a query is destructive or nondestructive with respect to one or more previously executed queries.

Referring now to FIG. 4, one embodiment of the step 316 for determining whether the subsequent query it is destructive or nondestructive is shown. At step 402, the query analysis algorithm 144 determines the differences between the initial query and the subsequent query. A loop is then entered at step 404 for each difference determined at step 402. For each difference, the algorithm 144 determines whether the difference is destructive (step 406). If so, the subsequent query is flagged as being destructive (step 408), and the algorithm exits. If no destructive differences are found, the subsequent query is flagged as nondestructive (step 410).

A list of exemplary rules for determining whether a query is destructive or nondestructive with respect to a previous query is shown in the following Table. It should be emphasized that the Table is exemplary, not exhaustive. Persons skilled in the art will readily recognize other rules.

TABLE

| Type of Change | Destructive of Non-Destructive |
|---|---|
| Add sorting of results | Non-Destructive |
| Sort on different result fields | Non-Destructive |
| Reorder result fields | Non-Destructive |
| Remove result fields | Non-Destructive |
| Add ANDed query condition involving result field found in the initial query results | Non-Destructive |
| Make query condition more restrictive AND field involved in condition is in initial query results | Non-Destructive |
| Rename result fields | Non-Destructive |
| Conversion of results from initial query | Non-Destructive |
| Make query condition less restrictive | Destructive |
| Add result fields | Destructive |
| Add ANDed query condition involving result field NOT found in the initial query results | Destructive |
| Add new ORed query condition | Destructive |
| Make query condition more restrictive AND field Involved in condition is NOT in initial query results | Destructive |

EXAMPLE OF ADDING SORTING OF RESULTS

PREVIOUS QUERY:
SELECT NAME, SALARY FROM EMPTABLE
SUBSEQUENT QUERY:
SELECT NAME, SALARY FROM EMPTABLE ORDER BY SALARY

EXAMPLE OF SORTING ON DIFFERENT RESULT FIELDS

PREVIOUS QUERY:
SELECT NAME, SALARY FROM EMPTABLE ORDER BY SALARY
SUBSEQUENT QUERY:
SELECT NAME, SALARY FROM EMPTABLE ORDER BY NAME

EXAMPLE OF REORDERING RESULT FIELDS

PREVIOUS QUERY:
SELECT NAME, SALARY FROM EMPTABLE
SUBSEQUENT QUERY:
SELECT SALARY, NAME FROM EMPTABLE

EXAMPLE OF REMOVING RESULT FIELDS

PREVIOUS QUERY:
SELECT NAME, SALARY FROM EMPTABLE
SUBSEQUENT QUERY:
SELECT NAME FROM EMPTABLE

EXAMPLE OF ADDING ANDED QUERY CONDITION INVOLVING RESULT FIELD FOUND IN THE INITIAL QUERY RESULTS

PREVIOUS QUERY:
SELECT NAME, SALARY FROM EMPTABLE
SUBSEQUENT QUERY:
SELECT NAME, SALARY FROM EMPTABLE WHERE SALARY>100000

EXAMPLE OF MAKING QUERY CONDITION MORE RESTRICTIVE AND FIELD INVOLVED IN CONDITION IS IN INITIAL QUERY RESULTS

PREVIOUS QUERY:
SELECT NAME, SALARY FROM EMPTABLE WHERE SALARY>100000
SUBSEQUENT QUERY:
SELECT NAME, SALARY FROM EMPTABLE WHERE SALARY>200000

EXAMPLE OF RENAMING RESULT FIELDS

PREVIOUS QUERY:
SELECT NAME, SALARY FROM EMPTABLE
SUBSEQUENT QUERY:
SELECT NAME AS "FIRST NAME", SALARY FROM EMPTABLE

EXAMPLE OF CONVERSION OF RESULTS FROM INITIAL QUERY

PREVIOUS QUERY:
SELECT FIRSTNAME, LASTNAME FROM EMPTABLE
SUBSEQUENT QUERY:
SELECT FIRSTNAME ||','|| LASTNAME FROM EMPTABLE

EXAMPLE OF MAKING QUERY CONDITION LESS RESTRICTIVE

PREVIOUS QUERY:
SELECT NAME, SALARY FROM EMPTABLE WHERE SALARY>100000
SUBSEQUENT QUERY:
SELECT NAME, SALARY FROM EMPTABLE WHERE SALARY>50000

EXAMPLE OF ADDING RESULT FIELDS

PREVIOUS QUERY:
SELECT NAME, SALARY FROM EMPTABLE
SUBSEQUENT QUERY:
SELECT NAME, SALARY, AGE FROM EMPTABLE

EXAMPLE OF ADDING ANDED QUERY CONDITION INVOLVING RESULT FIELD NOT FOUND IN THE INITIAL QUERY RESULTS

PREVIOUS QUERY:
SELECT NAME, SALARY FROM EMPTABLE
SUBSEQUENT QUERY:
SELECT NAME, SALARY FROM EMPTABLE WHERE AGE>40

EXAMPLE OF ADDING NEW ORED QUERY CONDITION

PREVIOUS QUERY:
SELECT NAME, SALARY FROM EMPTABLE WHERE SALARY>100000
SUBSEQUENT QUERY:
SELECT NAME, SALARY FORM EMPTABLE WHERE SALARY>100000 OR NAME='SMITH'

EXAMPLE OF MAKE QUERY CONDITION MORE RESTRICTIVE AND FIELD INVOLVED IN CONDITION IS NOT IN INITIAL QUERY RESULTS

PREVIOUS QUERY:
SELECT NAME, SALARY FROM EMPTABLE WHERE AGE>40
SUBSEQUENT QUERY:
SELECT NAME, SALARY FROM EMPTABLE WHERE AGE>50

As noted above, the comparative analysis implemented by the query analysis algorithm 144 need not be restricted to the "initial" query nor to any other single query. Rather, the comparative analysis may be performed between the current/subsequent query and each of the cached previously executed queries, or some subset of those queries. Accordingly, in some embodiments, the query analysis algorithm 144 may determine that the current query is nondestructive with respect to more than one previously executed query, where each previously executed query has its own temporary table 162. In such cases, it is contemplated that the current query may be executed against the temporary table having the least data. In other embodiments, the previously executed queries may be comparatively analyzed with respect to the current query according to the sizes of their respective temporary table. Specifically, analysis may proceed from the previously executed query having the smallest temporary table to the previously executed query having the largest temporary table. Analysis may be completed upon determining a nondestructive relationship between the current query and a previously executed query. In this manner, overhead may be minimized. Persons skilled in the art will recognize other techniques which may be used to reduce overhead.

While the foregoing is directed to embodiments of the present invention, other and further embodiments of the invention may be devised without departing from the basic scope thereof, and the scope thereof is determined by the claims that follow.

What is claimed is:

1. A method of processing queries, comprising:
receiving a query;
performing a comparative analysis between the query and one or more previously executed queries to determine a difference in scope with respect to results; and
executing the query against one of a first data source and a second data source depending upon the difference in scope determined by the comparative analysis, where the second data source is a subset of the first data source.

2. The method of claim 1, wherein executing the query comprises, executing the query against the first data source if a scope of the query is greater than a scope of the one or more previously executed queries.

3. The method of claim 1, wherein executing the query comprises, executing the query against the second data source if a scope of the query is less than a scope of the one or more previously executed queries.

4. The method of claim 1, wherein executing the query comprises:
executing the query against the first data source if a scope of the query is greater than a scope of the one or more previously executed queries; and
executing the query against the second data source if the scope of the query is less than the scope of the one or more previously executed queries.

5. The method of claim 1, wherein performing comparative analysis between the query and one or more previously executed queries to determine the difference in scope with respect to results comprises comparatively examining a structure of the query and a structure of the one or more previously executed queries.

6. The method of claim 1, wherein the second data source comprises one or more data structures populated with results returned by execution of the one or more previously executed queries.

7. A method of processing queries, comprising:
receiving a query;
performing a comparative analysis between the query and one or more previously executed queries to determine a difference in scope with respect to results; and
depending upon the difference in scope determined by the comparative analysis, performing one of:
executing the query against a first data source; and
restructuring the query and executing the restructured query against a second data source, where the second data source is a subset of the first data source.

8. The method of claim 7, wherein the query is executed against the first data source if a scope of the query is greater than a scope of the one or more previously executed queries.

9. The method of claim 7, wherein the query is executed against the second data source if a scope of the query is less than a scope of the one or more previously executed queries.

10. The method of claim 7, wherein the query is executed against the first data source if a scope of the query is greater than a scope of the one or more previously executed queries; and
wherein the query is executed against the second data source if the scope of the query is less than a scope of the one or more previously executed queries.

11. The method of claim 7, wherein performing comparative analysis between the query and one or more previously executed queries to determine the difference in scope with respect to results comprises comparatively examining a structure of the query and one or more previously executed queries.

12. The method of claim 7, wherein performing comparative analysis between the query and one or more previously executed queries to determine the difference in scope with respect to results comprises comparatively examining a structure of the query and a structure of the one or more previously executed queries.

13. The method of claim 7, wherein the second data source comprises one or more data structures populated with results returned by execution of the one or more previously executed queries.

14. A method of processing queries, comprising:
receiving a query;
performing comparative analysis between a structure of the query and a structure of a plurality of previously executed queries to determine a difference in scope with respect to results; and
upon determining that a results scope of the query is less than at least one of the plurality of previously executed queries:
restructuring the query; and
executing the restructured query against a first data source, where the first data source contains results returned from execution of the at least one of the plurality of previously executed queries.

15. The method of claim 14, wherein the first data source is a subset of a larger second data source against which the at least one of the plurality of previously executed queries was executed.

16. A computer readable medium containing a program which, when executed, performs an operation, comprising:
performing a comparative analysis between a query received for execution and one or more previously executed queries to determine a difference in scope with respect to results; and
submitting the query for execution against one of a first data source and a second data source depending upon the difference in scope determined by the comparative analysis, where the second data source is a subset of the first data source.

17. The computer readable medium of claim 16, wherein the query is submitted for execution against the first data source if a scope of the query is greater than a scope of the one or more previously executed queries.

18. The computer readable medium of claim 16, wherein the query is submitted for execution against the second data source if a scope of the query is less than a scope of the one or more previously executed queries.

19. The computer readable medium of claim 16, submitting the query for execution comprises:
submitting the query for execution against the first data source if a scope of the query is greater than a scope of the one or more previously executed queries; and
submitting the query for execution against the second data source if the scope of the query is less than the scope of the one or more previously executed queries.

20. The computer readable medium of claim 16, wherein performing comparative analysis between the query and one or more previously executed queries to determine the difference in scope with respect to results comprises comparatively examining a structure of the query and a structure of the one or more previously executed queries.

21. The computer readable medium of claim 16, wherein the second data source comprises one or more data structures populated with results returned by execution of the one or more previously executed queries.

22. A computer readable medium containing a program which, when executed, performs an operation, comprising:
performing a comparative analysis between a query received for execution and one or more previously executed queries to determine a difference in scope with respect to results; and
depending upon the difference in scope determined by the comparative analysis, performing one of:
submitting the query for execution against a first data source; and
restructuring the query and submitting the restructured query for execution against a second data source, where the second data source is a subset of the first data source.

23. The computer readable medium of claim 22, wherein the query is executed against the first data source if a scope of the query is greater than a scope of the one or more previously executed queries.

24. The computer readable medium of claim 22, wherein the query is executed against the second data source if a scope of the query is less than a scope of the one or more previously executed queries.

25. The computer readable medium of claim 22, wherein the query is executed against the first data source if a scope of the query is greater than a scope of the one or more previously executed queries; and
wherein the query is executed against the second data source if the scope of the query is less than a scope of the one or more previously executed queries.

26. The computer readable medium of claim 22, wherein performing comparative analysis between the query and one or more previously executed queries to determine the difference in scope with respect to results comprises comparatively examining a structure of the query and one or more previously executed queries.

27. The computer readable medium of claim 22, wherein performing comparative analysis between the query and one or more previously executed queries to determine the difference in scope with respect to results comprises comparatively examining a structure of the query and a structure of the one or more previously executed queries.

28. The computer readable medium of claim 22, wherein the second data source comprises one or more data structures populated with results returned by execution of the one or more previously executed queries.

29. A computer readable medium containing a program which, when executed, performs an operation, comprising:
performing a comparative analysis between a structure of a query received for execution and a structure of a plurality of previously executed queries to determine a difference in scope with respect to results; and
upon determining that a results scope of the query is less than at least one of the plurality of previously executed queries:
restructuring the query; and
executing the restructured query against a first data source, where the first data source contains results returned from execution of the at least one of the plurality of previously executed queries.

30. The computer readable medium of claim 29, wherein the first data source is a subset of a larger second data source against which the at least one of the plurality of previously executed queries was executed.

31. A computer system, comprising:
a data repository, comprising a first data source and a second data source, wherein the second data source is a data subset of the first data source populated with results of previously executing queries;
a runtime component; and
a processor which, when configured with the runtime component, performs an operation comprising:
performing a comparative analysis between a structure of a query received for execution and a structure of a previously executed query to determine a difference in scope with respect to results;
upon determining that a results scope of the query is greater than the previously executed query, executing the restructured query against the first data source; and
upon determining that the results scope of the query is less than the previously executed query:
(i) restructuring the query; and
(ii) executing the restructured query against the second data source.

* * * * *